UNITED STATES PATENT OFFICE.

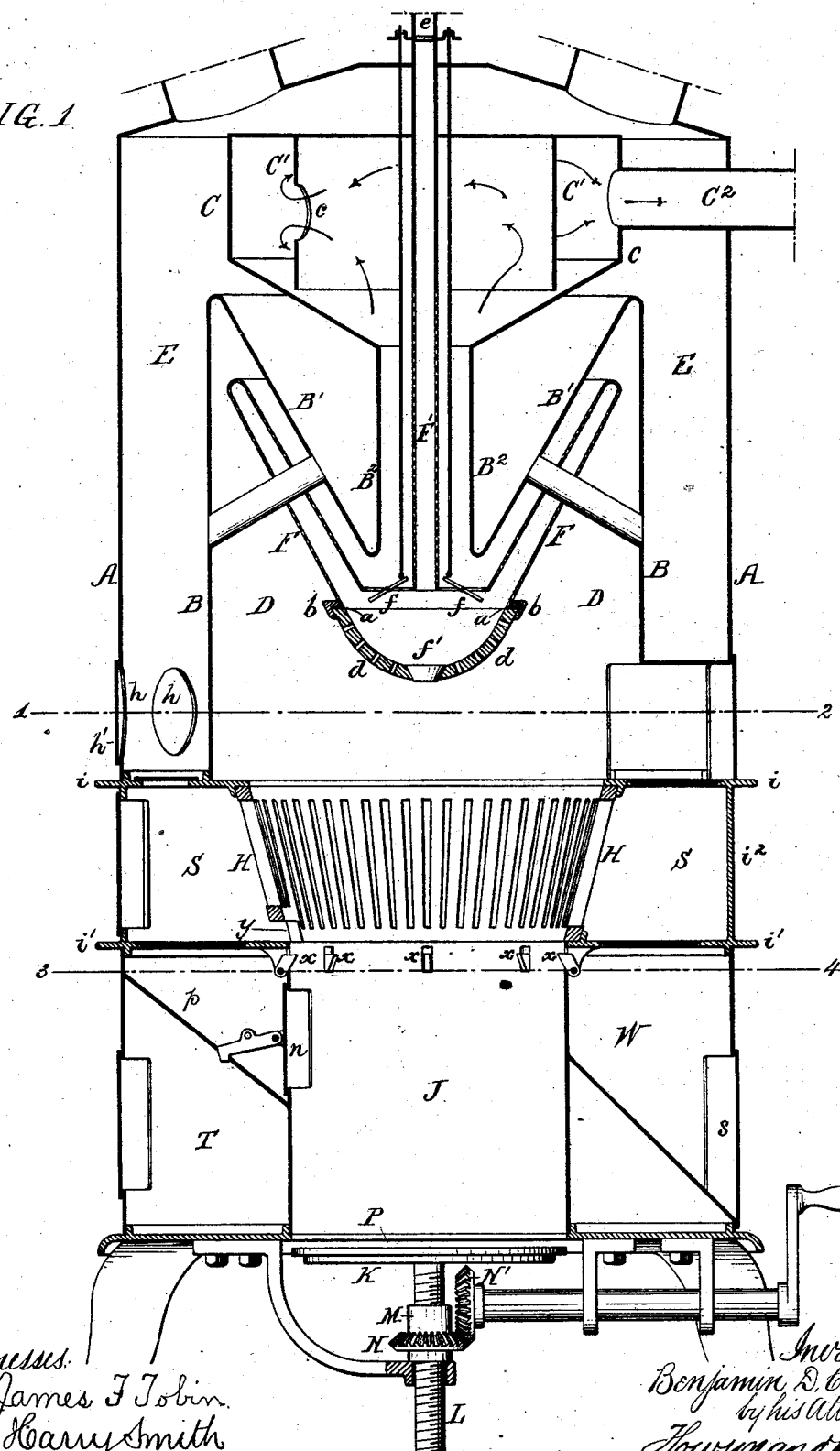

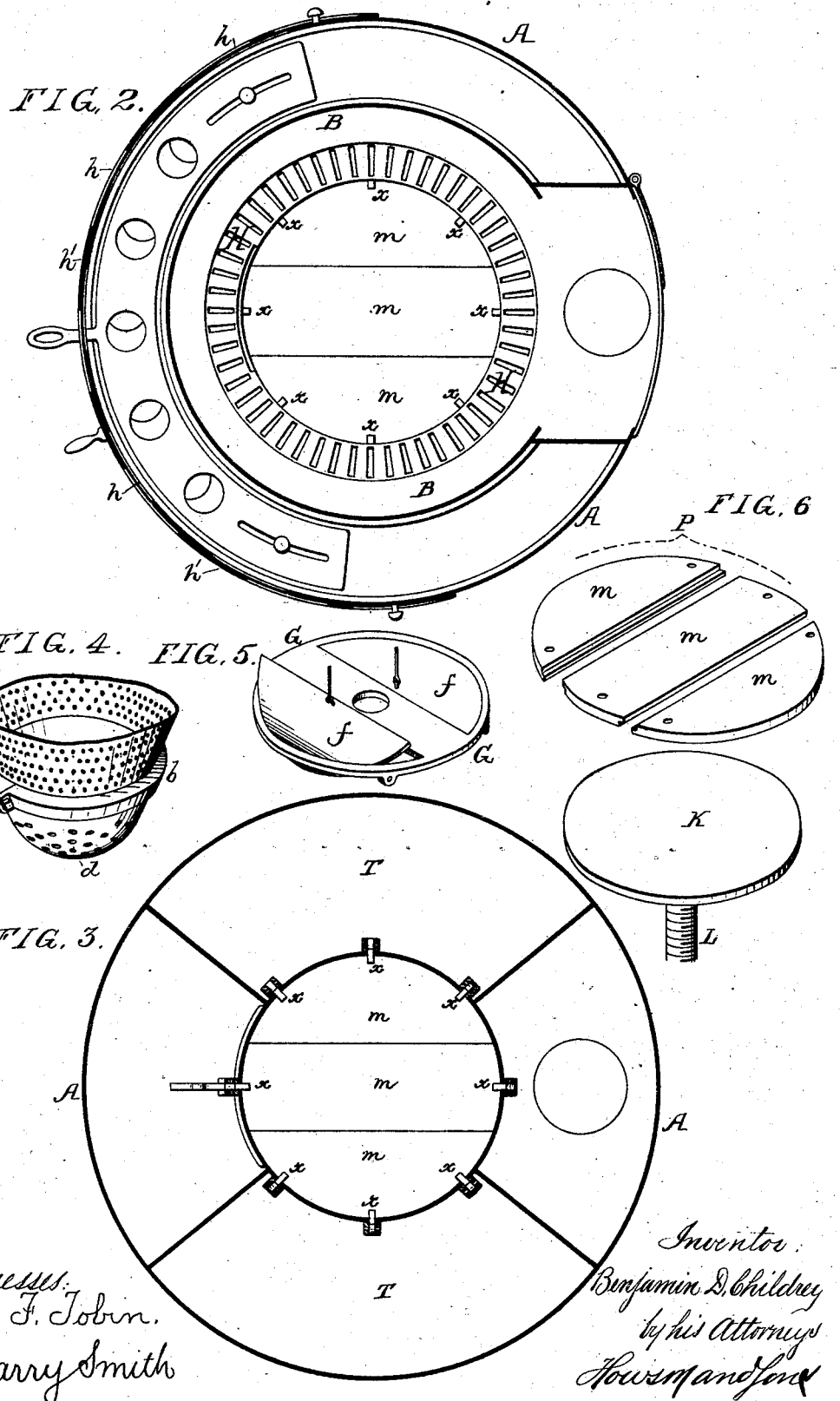

BENJAMIN D. CHILDREY, OF PHILADELPHIA, PENNSYLVANIA.

HEATING-FURNACE.

SPECIFICATION forming part of Letters Patent No. 248,141, dated October 11, 1881.

Application filed March 7, 1881. (No model.)

*To all whom it may concern:*

Be it known that I, BENJAMIN D. CHILDREY, a citizen of the United States, residing in Philadelphia, Pennsylvania, have invented certain Improvements in Heating and other Furnaces, of which the following is a specification.

The main object of my invention is to so construct a furnace as to economize the consumption of fuel and effect the thorough combustion of the gases evolved therefrom, a minor object being to prevent the choking of the passages or flues of the furnace with dust and fine ashes.

In the accompanying drawings, Figure 1, Sheet 1, is a transverse section of an air-heating furnace embodying my invention; Fig. 2, a sectional plan on the line 1 2, Fig. 1; Fig. 3, a sectional plan on the line 3 4; and Figs. 4, 5, and 6, detached views of parts of the heater.

A is the outer casing of the heater, made in sections fitted to rings, as usual; and B is an inner casing inclosing the combustion-chamber D, and having an inverted conical top, B', connected at the lower end to the central discharge-pipe, $B^2$, which is enlarged above to form the usual radiator, C, contained within the upper portion of the hot-air chamber E of the heater, and having an annular partition, C', with opening c, so that the products of combustion are compelled to take the circuitous course pointed out by the arrows, in order to escape through the pipe $C^2$ to the chimney.

Within the combustion-chamber D is an inverted conical shield, F, made hollow throughout, and supplied with air through a central tube, F', in the discharge-pipe $B^2$, the outer casing of the shield having at the lower end a flange, a, for the support of a clamping-ring, b, which embraces the upper end of an inverted dome, d, of fire-clay or other refractory material, the ring b being made in sections, bolted together, in order to permit its ready application to and removal from the dome d and flange a. (See Figs. 1 and 4.)

Perforations are formed in the inner and outer casings of the shield F in the dome d, and in the tube F', so that as the products of combustion rise in the chamber D, pass down through the annular space between the top B' and shield F, and ascend in the pipe $B^2$ said products are subjected to the action of numerous jets of highly-heated air from the dome, shield, and tube, and the complete ignition of said gases is insured before they can escape through the pipe $C^2$ to the chimney. The draft of the furnace induces the downward flow of air through the tube F', and the air is properly heated in its passage through the pipe and by circulation in contact with the highly-heated dome d and with the casings of the hollow shield F.

The tube F' has a valve, e, whereby the flow of air through said tube is regulated, and the stem of this valve has cranks, connected by means of suitable rods with pivoted valves f in the plate G, which connects the lower end of the tube F' and the inner casing of the shield F, so that whenever the valve e is closed the valves f are opened, and any dust or fine ashes which may have been carried up by the products of combustion and deposited on said valves f will be dumped into the dome d, from which the accumulations may be allowed to discharge themselves at intervals by raising the central plug, f', with which said dome is provided.

The accumulation of dust and fine ashes in the radiator C is prevented by allowing a space to intervene between the lower edge of the partition C' and the inclined bottom of the radiator-casing, so that dust and ashes will be directed through the central pipe, $B^2$, and onto the valves f, accumulation of dust, &c., upon which is prevented by the frequent opening of the said valves, resulting from the necessity of operating the valve e in the air-tube F'. The valves f also provide a means of establishing direct draft between the combustion-chamber D and pipe $B^2$, through the perforations of the dome d and shield F in starting the fire.

Cold air is supplied to the chamber E through openings h in the casing A, the area of these openings being regulated by a sliding damper, h'.

H is a grated fire-pot, suitably supported above a magazine, J, the fire-pot section consisting in the present instance of two rings, i i', and an annular casing, $i^2$.

K is a disk, secured to the upper end of a screw-stem, L, which passes through a threaded sleeve, M, forming part of a cog-wheel, N, and bearing on an arm secured to the base-plate of the furnace, this cog-wheel engaging with a pinion, N', on a shaft, also adapted to bearings, secured to the base-plate. When the disk K is at the limit of its downward movement, and some distance beneath the base-plate of the furnace, plates $m$ are deposited upon the disk, these plates forming a circular platform, P, nearly equal in diameter to the magazine J, so that when the shaft carrying the pinion N' is operated and the disk K elevated until the platform P occupies a position in the lower end or mouth of the magazine said platform will fit snugly, but so as to move freely, within said magazine.

The magazine is filled with coal through an opening, $n$, in one side of the same, the coal being directed to said opening by a chute, $p$, and being introduced into the chute through openings in the ring $i'$ and casing $i^2$, the various openings being provided with suitable doors or covers, which are closed when the magazine is full. The disk K and its platform P are then elevated until the upper portion of the mass of coal occupies a position in the grated fire-pot H, this portion of the mass being then ignited, and air for supplying combustion being admitted to the space S, surrounding the fire-pot. This air-supply may be derived through openings in the ring $i'$, from the chamber T, partially surrounding the magazine, or air may be admitted from the hot-air chamber E through openings in the ring $i$, said openings being furnished with suitable dampers. As that portion of the mass of fuel within the grated fire-pot is consumed fresh supplies are introduced from below by elevating the platform P at the desired intervals, and the ashes are raked from the top by means of a suitable instrument introduced through openings in the casings A and B, the ashes passing through openings in the rings $i$ and $i'$ into an ash-receptacle, W, from which they can be withdrawn at intervals through an opening, $s$. When the platform P has been elevated until it occupies a position at the base of the grated fire-pot H it is caught and retained by weighted pawls $x$, hung to lugs on the ring $i'$, and adapted to slots in the magazine-casing, the pawls falling beneath the edges of the platform P and supporting the same when the disk K is lowered. New plates $m$ are then applied to the disk, and a fresh supply of coal is introduced into the magazine, the first platform P, on the elevation of this fresh supply of coal, being raised from the pawls $x$, so that the plates $m$ comprising the platform can be withdrawn by a suitable instrument through a slot, $y$, in the grated fire-pot, and through the door in the casing $i^2$, prior to being again used as a support for a fresh supply of coal.

I have found that by this method of burning the fuel at the top only and introducing the fresh fuel from below combustion is complete, and is carried on at a slower rate than usual, the evolving of large volumes of unignited gas on the introduction of each fresh supply of fuel, as in the ordinary method of feeding, being prevented, as all the gases evolved from the fresh fuel in my improved furnace are compelled to pass through the mass of incandescent fuel above before they enter the combustion-chamber. In addition to the supplies of air from the chamber S, or in place of the same in some cases, air may be permitted to pass from below through the fuel in the magazine J.

I am aware that it is not new to charge a fire-pot with fuel from below, the entire mass of fresh fuel being thrust into the fire-pot at one operation; but my invention is distinct from this, in that the charging operation is gradual, the upper portion of the mass of fuel in the magazine being thoroughly coked by the incandescent fuel above before it is elevated into the fire-pot, so that the admission of green fuel to the latter is prevented.

The admission of volumes of heated air to the combustion-chamber above the fire-pot is also an important feature of my invention, because, owing to the method of feeding the fuel to the fire-pot, the gases evolved from the latter are not in proper condition for combustion until supplied with a certain quantity of oxygen, which the heated air furnishes.

Although I have shown my invention as applied to an air-heating furnace, it will be evident that it can be applied as well to steam-boiler furnaces, or to puddling, heating, or other metallurgical furnaces.

It will be observed that the shield F compels the products of combustion to pass in intimate contact with the under side of the inverted conical top of the combustion-chamber, so that a high degree of heat is imparted thereto, the upper side of the same forming an extended radiating-surface.

I claim as my invention—

1. As an improvement in effecting the combustion of fuel in furnaces, the mode herein described, said mode consisting in maintaining a mass of fuel in an incandescent state in a fire-pot, gradually feeding fresh fuel to the fire-pot from below, and introducing volumes of heated air into the combustion-chamber above the fire-pot, whereby the heated gases arising from the incandescent fuel are ignited, as set forth.

2. The combination of the grated fire-pot and fuel-elevating devices with the fuel-magazine arranged below said fire-pot, communicating directly with the lower end of the same, and having in one side below the fire-pot a feed-opening, as set forth.

3. The combination of the grated fire-pot, the fuel-magazine arranged below and communicating with the lower end of the fire-pot, and having a feed-opening at one side, a fuel-supporting platform, and a threaded rod, L, and nut M, for operating said platform, as specified.

4. The combination of the fire-pot and magazine, the platform P, devices for elevating the same, and the pawls $x$, adapted to support the platform when the elevating devices are withdrawn, as specified.

5. The combination of the fire-pot having a slot, $y$, the magazine J, the platform P, made in sections, the elevating devices, and the supporting-lugs $x$, as set forth.

6. The combination of the hollow perforated shield F in the combustion-chamber with a tube or pipe for supplying air to the interior of the same, as set forth.

7. The combination of the hollow perforated shield F in the combustion-chamber, the escape-pipe $B^2$ of said combustion-chamber, and the perforated tube F' in said escape-pipe, as set forth.

8. The combination of the flanged shield F, the dome $d$, and the sectional retaining-ring $b$, adapted to the flange and dome, as set forth.

9. The combination of the casing of the combustion-chamber, the shield F, the tube F', the escape-pipe $B^2$, and the plate G, connecting the tube and shield, and having pivoted valves $f$, as set forth.

10. The combination of the casing of the combustion-chamber, the escape-pipe $B^2$, the shield F, the tube F', having a valve, $e$, the connecting-plate G, having valves $f$, and connections between said valves $e$ and $f$, whereby simultaneous operation of the valves is insured, as specified.

11. The combination of the escape-pipe $B^2$, the radiator C, having an inclined bottom, and the partition C', disconnected from the bottom of the radiator, thereby forming a space between the two, as set forth.

In testimony whereof I have signed my name to this specification in the presence of two subscribing witnesses.

BENJAMIN D. CHILDREY.

Witnesses:
JAMES F. TOBIN,
HARRY SMITH.